United States Patent
Wang et al.

(10) Patent No.: US 8,564,251 B2
(45) Date of Patent: Oct. 22, 2013

(54) SWITCH EMBEDDED INTEGRATED CIRCUIT AND METHOD FOR BATTERY PROTECTION

(75) Inventors: Chin-Hui Wang, Banqiao (TW); Zheng-Lin Pu, Shanghai (CN); Ying-Jie Han, Shanghai (CN)

(73) Assignee: RichPower Microelectronics Corporation, Grand Cayman (KY)

(*) Notice: Subject to any disclaimer, the term of this patent is extended or adjusted under 35 U.S.C. 154(b) by 688 days.

(21) Appl. No.: 12/728,572

(22) Filed: Mar. 22, 2010

(65) Prior Publication Data

US 2010/0253293 A1    Oct. 7, 2010

(30) Foreign Application Priority Data

Apr. 2, 2009    (TW) .............................. 98110988 A

(51) Int. Cl.
*H02J 7/06* (2006.01)
(52) U.S. Cl.
USPC .......................................... 320/164; 320/134
(58) Field of Classification Search
USPC ......................................................... 320/164
See application file for complete search history.

(56) References Cited

U.S. PATENT DOCUMENTS

| | | | | |
|---|---|---|---|---|
| 5,547,775 A | * | 8/1996 | Eguchi et al. | 320/118 |
| 5,554,919 A | * | 9/1996 | Uchida | 320/132 |
| 6,992,463 B2 | * | 1/2006 | Yoshio | 320/134 |
| 7,324,315 B2 | * | 1/2008 | Harris | 361/58 |

* cited by examiner

*Primary Examiner* — Drew A Dunn
*Assistant Examiner* — Robert Grant
(74) *Attorney, Agent, or Firm* — Muncy, Geissler, Olds & Lowe, PLLC

(57) ABSTRACT

A switch embedded integrated circuit for battery protection includes a first pin to be connected with one terminal of a battery, a second pin to be connected with a load or charger, a third pin to be connected with another terminal of the battery, a MOSFET having a body diode thereof and connected between the first and second pins, a control logic circuit and a detection circuit. The detection circuit monitors the voltage between the first pin and the third pin to determine a detection signal for the control logic circuit to turn on or off the MOSFET and switch the direction of the body diode, thereby providing an over charging and an over discharging protection functions.

11 Claims, 5 Drawing Sheets

SWITCH EMBEDDED INTEGRATED CIRCUIT AND METHOD FOR BATTERY PROTECTION

FIELD OF THE INVENTION

The present invention is related to a battery protection circuit and method.

BACKGROUND OF THE INVENTION

A battery-based power supply typically includes a protection circuit for detecting battery conditions, so as to prevent dangerous operations such as over charging, over discharging, and over-current operation while the battery is being charged or discharged. Conventionally, as shown in FIG. 1, a battery package 10 for portable electronic devices includes a battery 12, MOSFETs M1 and M2, and a protection circuit 14. The MOSFETs M1 and M2 have body diodes D1 and D2, respectively, and the body diodes D1 and D2 are arranged back to back. The protection circuit 14 detects the voltage of the battery 12 and turns on or off MOSFETs M1 and M2 accordingly, thereby controlling a current flowing into or out of the battery package 10. A resistor 16 and a current source 18 represent the load and a charger, respectively. During charging operation, the current source 18 provides a charge current for charging the battery 12; during discharging operation, the battery 12 provides a discharge current to the resistor 16.

During normal charging or discharging operation, both the MOSFETs M1 and M2 are turned on such that the charge current and the discharge current flow through the same path, namely by way of the MOSFETs M1 and M2; besides, since the voltage drop across the MOSFET M1 as well as the MOSFET M2 is small, neither of the body diodes D1 and D2 is conducted. However, when the protection circuit 14 detects that the battery 12 is over charging, the MOSFET M1 will be turned off while the MOSFET M2 will be turned on. Thus, the body diode D1 blocks the charge current and only allows the discharge current to pass through. On the other hand, when the protection circuit 14 detects that the battery 12 is over discharging, the MOSFET M1 will be turned on, and the MOSFET M2 will be turned off. Consequently, the body diode D2 blocks the discharge current and only allows the charge current to flow through.

However, the conventional method described above needs two MOSFETs, i.e., M1 and M2, which result in high costs and require a large die area. Moreover, when the discharge current or the charge current flows through the body diode D1 or D2, overheating and power loss occur.

Therefore, it is desired a battery protection apparatus capable of reducing costs, decreasing die area, avoiding overheating, and reducing power loss.

SUMMARY OF THE INVENTION

An object of the present invention is to provide a switch embedded integrated circuit (IC) and method for battery protection.

According to the present invention, a switch embedded IC for battery protection includes a MOSFET coupled between a first pin and a second pin of the switch embedded IC and having a body diode, a first switch coupled to an anode of the body diode and controlled to couple the anode of the body diode to the first pin or the second pin, a second switch coupled to a cathode of the body diode and controlled to couple the cathode of the body diode to the first pin or the second pin, a control logic circuit for controlling the MOSFET, the first switch, and the second switch according to a detection signal, and a detection circuit coupled to the control logic circuit for monitoring the voltage difference between the first pin and a third pin of the switch-embedded IC to determine the detection signal. The first pin is to couple with a terminal of the battery, the second pin is to couple with a load or a charger, and the third pin is to couple with another terminal of the battery. Upon detecting an over charging event, the detection circuit triggers the detection signal and thus causes the control logic circuit to turn off the MOSFET and switch the first and second switches such that the body diode blocks the charge current but allows a discharge current to pass through. Upon detecting an over discharging event, the detection circuit triggers the detection signal and thus causes the control logic circuit to turn off the MOSFET and switch the first and second switches such that the body diode blocks the discharge current while allowing a charge current to pass through.

According to the present invention, a method for battery protection includes monitoring the voltage of a battery to determine a detection signal, and turning on or off a MOSFET and switching the direction of a body diode of the MOSFET according to the detection signal. The MOSFET has a first terminal coupled to the battery and a second terminal coupled to a load or a charger. When an over charging event is detected, the MOSFET is turned off, and the direction of the body diode is switched to block the charge current but allow a discharge current to pass through. When an over discharging event is detected, the MOSFET is turned off, and the direction of the body diode is switched to block the discharge current but allow a charge current to pass through.

Since only a single MOSFET is used to control the charging and discharging of a battery, the costs and the die area are both reduced. Furthermore, as the MOSFET, the control logic circuit, and the detection circuit are integrated into a same IC, circuitry of the resultant circuit board is simplified as well.

BRIEF DESCRIPTION OF THE DRAWINGS

These and other objects, features and advantages of the present invention will become apparent to those skilled in the art upon consideration of the following description of the preferred embodiments according to the present invention taken in conjunction with the accompanying drawings, in which.

DETAIL DESCRIPTION OF THE INVENTION

Figure 1:
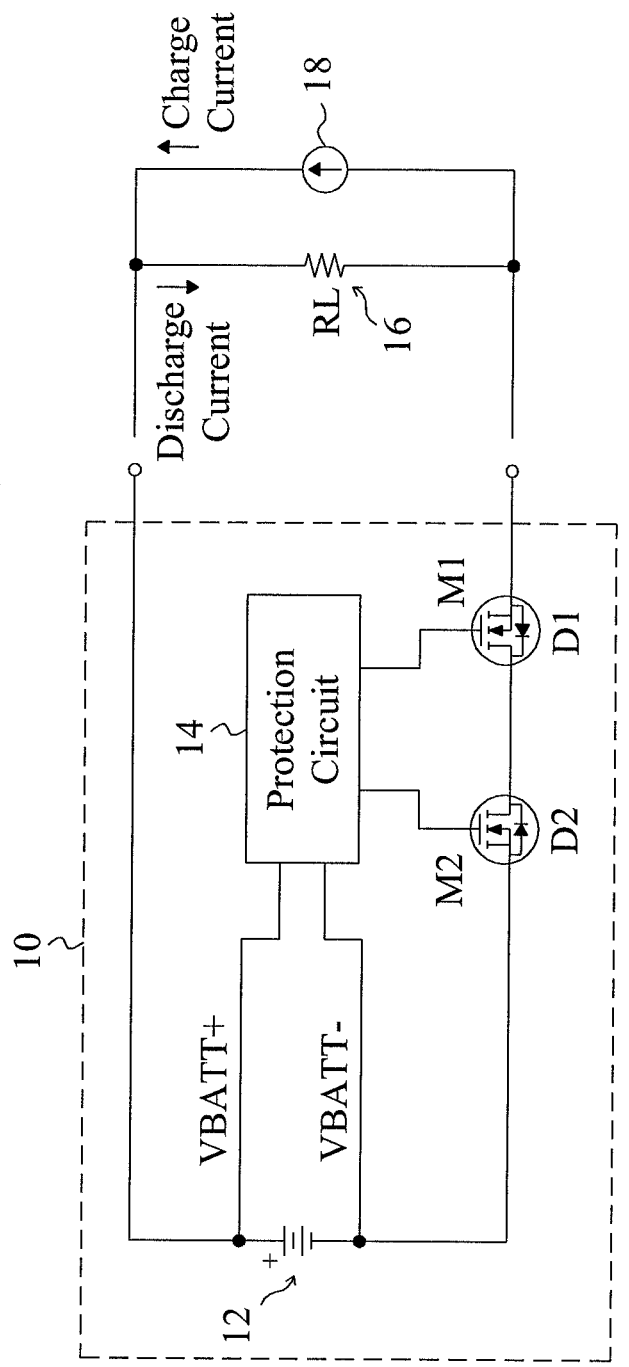
FIG. 1 shows a conventional battery package for portable electronic devices.
Figure 2:
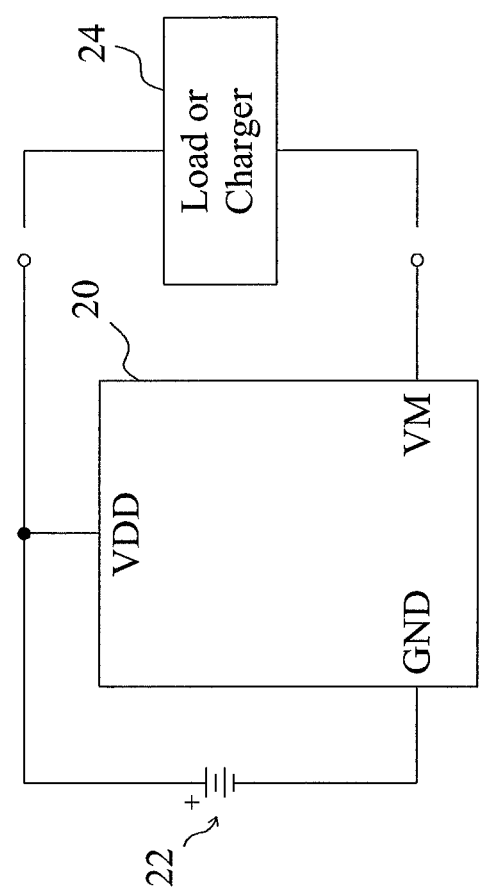
FIG. 2 shows a low-side switch embedded IC for battery protection according to the present invention.
Figure 3:
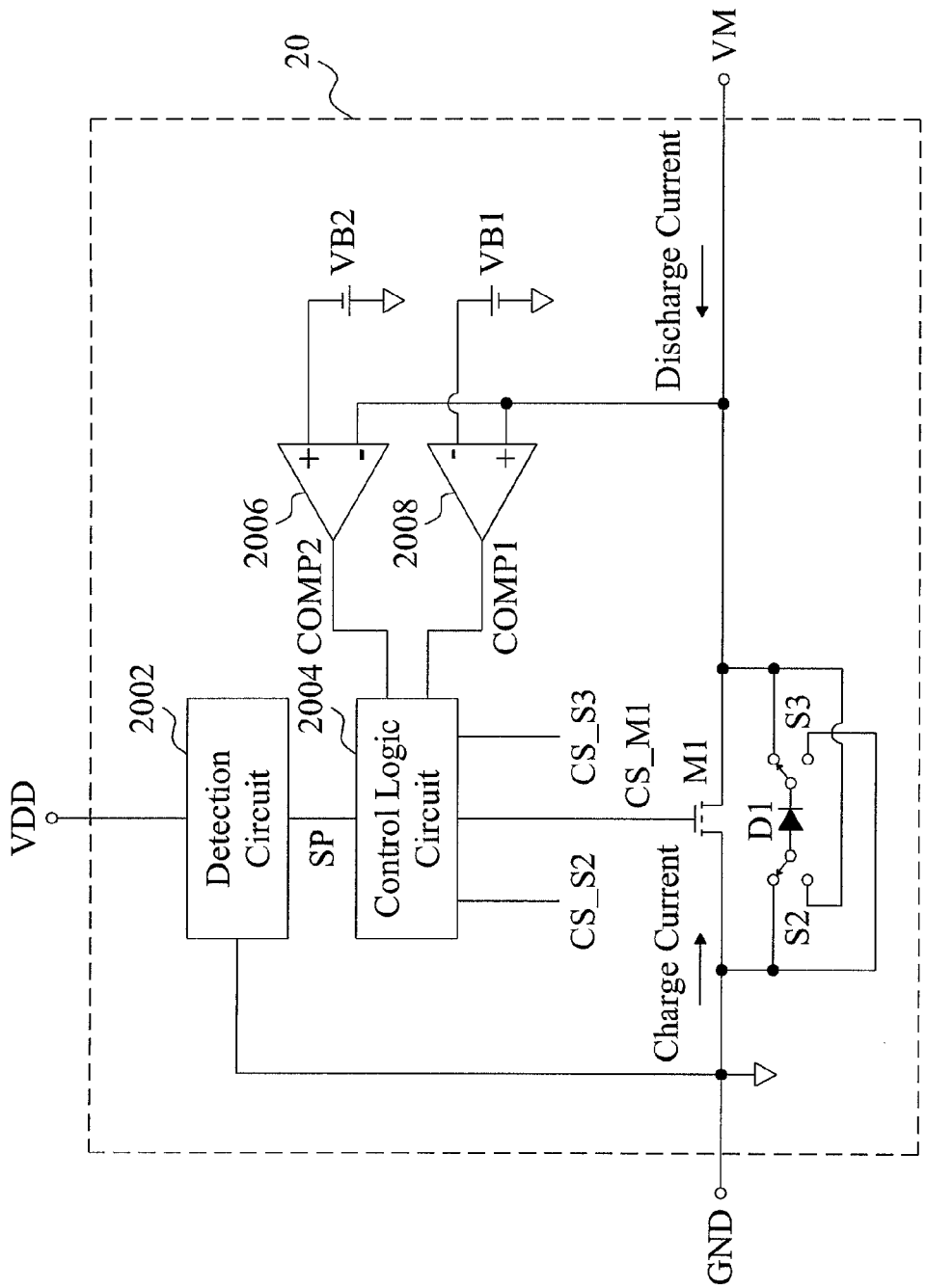
FIG. 3 shows an embodiment for the low-side switch embedded IC of FIG. 2.

According to the present invention, as shown in FIG. 2, a low-side switch embedded IC 20 for battery protection includes three pins VDD, GND, and VM. A battery 22 is coupled between the pins VDD and GND, and a load or a charger 24 is coupled between the pins VDD and VM. FIG. 3 shows an embodiment for the low-side switch embedded IC 20 of FIG. 2, in which a MOSFET M1 is coupled between the pins GND and VM and has a body diode D1, a switch S2 couples an anode of the body diode D1 to the pin GND or VM, and a switch S3 couples a cathode of the body diode D1 to the pin GND or VM. By switching the switches S2 and S3, the direction of the body diode D1 is changed. In addition, a detection circuit 2002 coupled to the pins VDD and GND monitors the voltage of the battery 22 to determine a detection signal SP, and a control logic circuit 2004 generates control signals CS_M1, CS_S2, and CS_S3 according to the detection signal SP, to control the MOSFET M1, the switch S2, and the switch S3, respectively. A comparator 2006 compares the voltage at the pin VM with a threshold value VB2 to generate a comparison signal COMP2 for the control logic circuit 2004, and a comparator 2008 compares the voltage at the pin VM with a threshold value VB1 to generate a comparison signal COMP1 for the control logic circuit 2004. Since the charging and discharging of the battery 22 is controlled by the single MOSFET M1, the costs and the die area are both reduced. Furthermore, as the protection circuit and the MOSFET M1 are integrated into the same IC 20, the resultant circuit board has a simple circuitry as shown in FIG. 2.

During normal charging or discharging operation, the MOSFET M1 is turned on, thus allowing a charge current or a discharge current to flow into or out of the battery 22 through the MOSFET M1. Upon detecting an over discharging event, the detection circuit 2002 sends out the corresponding detection signal SP to the control logic circuit 2004, so as to turn off the MOSFET M1 and couple the anode and the cathode of the body diode D1 to the pins GND and VM, respectively. As a result, the body diode D1 blocks the discharge current and only allows a charge current to pass through, thereby achieving over discharging protection function. During the over discharging protection period, if the battery 22 starts to be charged, the charge current will flow through the body diode D1 and thus generate a voltage drop of approximately 0.7V across the body diode D1. In consequence, the body diode D1 generates heat and consumes power. After the battery 22 is charged for a while, the voltage at the pin VM will be lower than the threshold value VB2 such that the comparator 2006 sends out the comparison signal COMP2 to the control logic circuit 2004, thereby turning on the MOSFET M1 and terminating the over discharging protection. Since the voltage across the MOSFET M1 is now far lower than 0.7V, the charge current will pass through the MOSFET M1 instead of the body diode D1, thus preventing overheating and reducing power loss.

On the other hand, upon detecting an over charging event, the detection circuit 2002 sends out the corresponding detection signal SP to the control logic circuit 2004, to turn off the MOSFET M1 and couple the anode and the cathode of the body diode D1 to the pins VM and GND, respectively. In consequence, the body diode D1 blocks the charge current and only allows a discharge current to pass through, thus achieving over charging protection function. During the over charging protection period, if the battery 22 begins to discharge, the discharge current will flow through the body diode D1 such that the body diode D1 generates heat and consumes power, which is similar to the case with the charge current in the over discharging protection period as described in the previous paragraph. After the battery 22 is discharged for a while, the voltage at the pin VM becomes higher than the threshold value VB1. Hence, the comparator 2008 sends out the comparison signal COMP1 to the control logic circuit 2004, thereby turning on the MOSFET M1 and terminating the over charging protection. Since the voltage across the MOSFET M1 is now far lower than 0.7V, the discharge current will flow through the MOSFET M1 instead of the body diode D1, and as a result, overheating is prevented and power loss is reduced.

Figure 4:
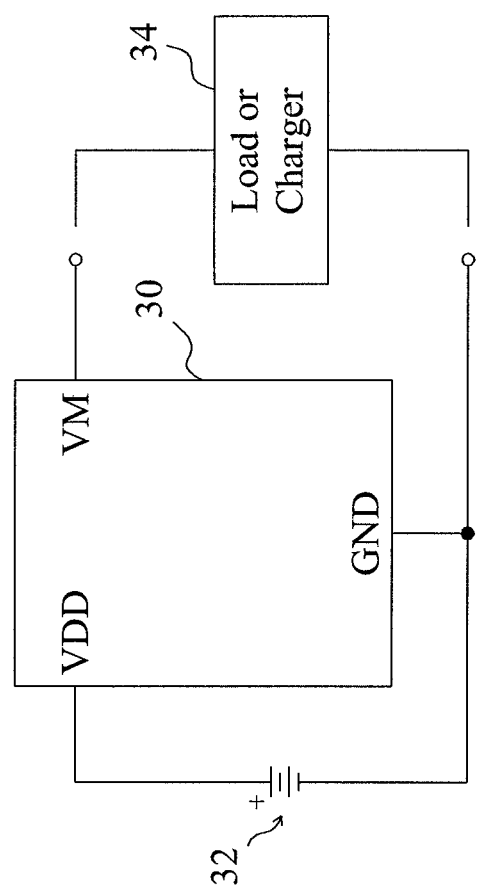
FIG. 4 shows a high-side switch embedded IC for battery protection according to the present invention.
Figure 5:
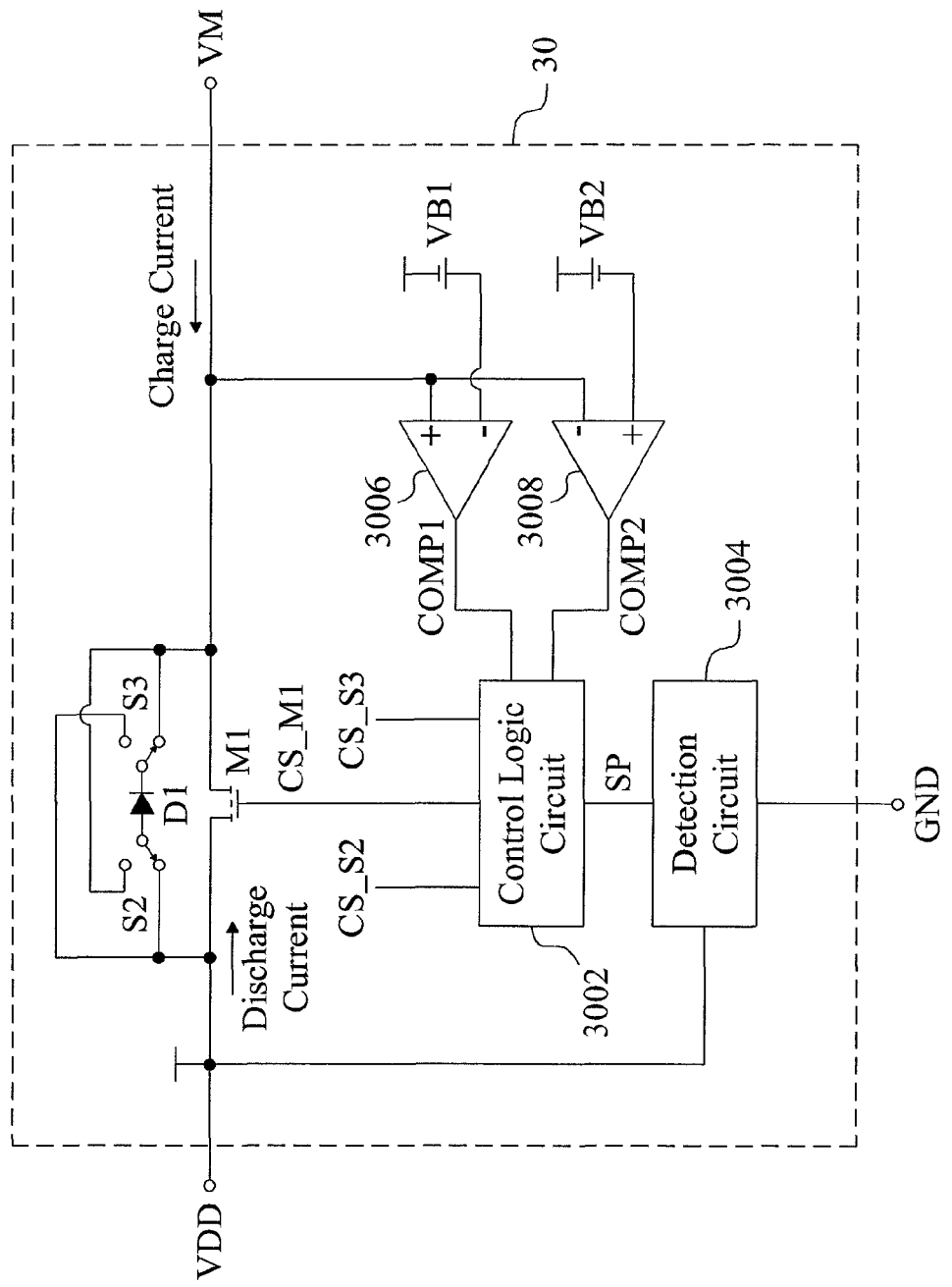
FIG. 5 shows an embodiment for the high-side switch embedded IC of FIG. 4.

FIG. 4 shows a high-side switch embedded IC 30 for battery protection, which includes three pins VDD, GND, and VM. A battery 32 is coupled between the pins VDD and GND, and a load or a charger 34 is coupled between the pins VM and GND. FIG. 5 shows an embodiment for the high-side switch embedded IC 30 of FIG. 4, in which a MOSFET M1 is coupled between the pins VDD and VM and has a body diode D1, a switch S2 couples an anode of the body diode D1 to the pin VDD or VM, and a switch S3 couples a cathode of the body diode D1 to the pins VDD or VM. The direction of the body diode D1 is changed by switching the switches S2 and S3. Besides, a detection circuit 3004 is coupled to the pins VDD and GND to monitor the voltage of the battery 32 and determine a detection signal SP accordingly, a control logic circuit 3002 generates control signals CS_M1, CS_S2, and CS_S3 according to the detection signal SP to control the MOSFET M1, the switch S2, and the switch S3, respectively. A comparator 3006 compares the voltage at the pin VM with a threshold value VB1 to generate a comparison signal COMP1 for the control logic circuit 3002, and a comparator 3008 compares the voltage at the pin VM with a threshold value VB2 to generate a comparison signal COMP2 for the control logic circuit 3002. Since the charging and discharging of the battery 32 is controlled by the single MOSFET M1, the costs and the die area are both reduced. In addition, now that the protection circuit and the MOSFET M1 are integrated into the same IC 30, circuitry of the resultant circuit board is simplified, as shown in FIG. 4.

During normal charging or discharging operation, the MOSFET M1 is turned on, and in consequence a charge current or a discharge current may flow into or out of the battery 32 through the MOSFET M1. However, upon detecting an over charging event, the detection circuit 3004 sends out the corresponding detection signal SP to the control logic circuit 3002, to turn off the MOSFET M1 and couple the anode and the cathode of the body diode D1 to the pins VDD and VM, respectively. As a result, the body diode D1 blocks the charge current and only allows a discharge current to pass through, thereby achieving over charging protection function. During the over charging protection period, if the battery 32 begins to discharge, the discharge current will flow through the body diode D1 and thus generate a voltage drop across the body diode D1 such that the body diode D1 generates heat and consumes power. After the battery 32 is discharged for a while, the voltage at the pin VM becomes lower than the threshold value VB2. Accordingly, the comparator 3008 sends out the comparison signal COMP2 to the control logic circuit 3002 to turn on the MOSFET M1 and thereby terminate the over charging protection. Once the MOSFET M1 is turned on, the discharge current will pass through the MOSFET M1 instead of the body diode D1, and in consequence overheating is prevented and power loss is reduced.

On the other hand, upon detecting an over discharging event, the detection circuit 3004 sends out the corresponding detection signal SP to the control logic circuit 3002, thereby turning off the MOSFET M1 and coupling the anode and the cathode of the body diode D1 to the pins VM and VDD, respectively. As a result, the body diode D1 blocks the discharge current and only allows a charge current to pass through, thus achieving over discharging protection function. During the over discharging protection period, if the battery 32 begins to be charged, the charge current will flow through the body diode D1 such that the body diode D1 generates heat and consumes power. After the battery 32 is charged for a while, the voltage at the pin VM becomes higher than the threshold value VB1. Hence, the comparator 3006 sends out the comparison signal COMP1 to the control logic circuit 3002 to turn on the MOSFET M1 and thereby terminate the over discharging protection. Once the MOSFET M1 is turned on, the charge current will pass through the MOSFET M1 instead of the body diode D1 such that overheating is prevented and power loss is reduced.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A switch embedded IC for battery protection, comprising:
   a MOSFET coupled between a first pin and a second pin of the switch embedded IC and having a body diode, wherein the first pin is to couple with an terminal of a battery, and the second pin is to couple with a load or a charger;
   a first switch coupled to an anode of the body diode and controlled to couple the anode of the body diode to the first pin or the second pin;
   a second switch coupled to a cathode of the body diode and controlled to couple the cathode of the body diode to the first pin or the second pin;
   a control logic circuit coupled to the MOSFET, the first switch, and the second switch, for controlling the MOSFET, the first switch, and the second switch according to a detection signal; and
   a detection circuit coupled to the control logic circuit, the first pin, and a third pin of the switch embedded IC, for monitoring a voltage between the first pin and the third pin to determine the detection signal, wherein the third pin is to couple with another terminal of the battery.

2. The switch embedded IC of claim 1, wherein the detection circuit, upon detecting an over charging event, triggers the detection signal and thus causes the control logic circuit to turn off the MOSFET and switch the first and second switches such that the body diode blocks a charge current and only allows a discharge current to pass through.

3. The switch embedded IC of claim 2, wherein the anode and the cathode of the body diode are coupled to the second pin and the first pin, respectively.

4. The switch embedded IC of claim 3, further comprising a comparator coupled to the control logic circuit for comparing a voltage at the second pin with a threshold value and, if the voltage at the second pin is higher than the threshold value, providing a comparison signal to the control logic circuit to turn on the MOSFET.

5. The switch embedded IC of claim 2, wherein the anode and the cathode of the body diode are coupled to the first pin and the second pin, respectively.

6. The switch embedded IC of claim 5, further comprising a comparator coupled to the control logic circuit for comparing a voltage at the second pin with a threshold value and, if the voltage at the second pin is lower than the threshold value, providing a comparison signal to the control logic circuit to turn on the MOSFET.

7. The switch embedded IC of claim 1, wherein the detection circuit, upon detecting an over discharging event, triggers the detection signal and thus causes the control logic circuit to turn off the MOSFET and switch the first and second switches such that the body diode blocks a discharge current and only allows a charge current to pass through.

8. The switch embedded IC of claim 7, wherein the anode and the cathode of the body diode are coupled to the first pin and the second pin, respectively.

9. The switch embedded IC of claim 8, further comprising a comparator coupled to the control logic circuit for comparing a voltage at the second pin with a threshold value and, if the voltage at the second pin is lower than the threshold value, providing a comparison signal to the control logic circuit to turn on the MOSFET.

10. The switch embedded IC of claim 7, wherein the anode and the cathode of the body diode are coupled to the second pin and the first pin, respectively.

11. The switch embedded IC of claim 10, further comprising a comparator coupled to the control logic circuit for comparing a voltage at the second pin with a threshold value and, if the voltage at the second pin is higher than the threshold value, providing a comparison signal to the control logic circuit to turn on the MOSFET.

* * * * *